US012307615B2

(12) United States Patent
Nemeth et al.

(10) Patent No.: US 12,307,615 B2
(45) Date of Patent: *May 20, 2025

(54) INTEGRATED MANAGEMENT OF SENSITIVE CONTROLLED ENVIRONMENTS AND ITEMS CONTAINED THEREIN

(71) Applicant: CURRENT LIGHTING SOLUTIONS, LLC, Beachwood, OH (US)

(72) Inventors: Kenneth Craig Nemeth, Montreal (CA); Abdul Rahman Mohammed Omar, Montreal (CA)

(73) Assignee: CURRENT LIGHTING SOLUTIONS, LLC, Beachwood, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/638,954

(22) Filed: Apr. 18, 2024

(65) Prior Publication Data

US 2024/0265653 A1    Aug. 8, 2024

Related U.S. Application Data

(63) Continuation of application No. 17/251,631, filed as application No. PCT/US2019/036701 on Jun. 12, 2019, now Pat. No. 11,989,836.

(Continued)

(51) Int. Cl.
*G06T 19/00* (2011.01)
*G01N 21/01* (2006.01)
*G01N 21/88* (2006.01)

(52) U.S. Cl.
CPC ........... *G06T 19/006* (2013.01); *G01N 21/01* (2013.01); *G01N 21/8803* (2013.01); *G01N 2021/0137* (2013.01); *G06T 2219/028* (2013.01)

(58) Field of Classification Search
None
See application file for complete search history.

(56) References Cited

U.S. PATENT DOCUMENTS 8,359,288 B1 * 1/2013 Kahn ................. G01C 21/3461
707/800
9,064,389 B1 * 6/2015 Bernstein ............... G08B 25/10
(Continued)

OTHER PUBLICATIONS

Information Disclosure Statement dated Dec. 12, 2020 which was filed in connection with U.S. Appl. No. 17/251,631.
(Continued)

*Primary Examiner* — David H Chu
(74) *Attorney, Agent, or Firm* — Buckley, Maschoff & Talwalkar LLC

(57) ABSTRACT

A system (100) for monitoring a controlled spatial volume (102) includes a lighting fixture (104) with one or more embedded sensors (106), a communication device (108) to provide monitored sensor data (142) for storage within a data store (140), a server (130) including a data analytic unit (136) in communication with the data store, the data analytic unit accessing the monitored sensor data to analyze the monitored data and provide status information on the spatial volume. The server can include a machine vision unit (138) to analyze the monitored data and create augmented reality renditions (520), which are rendered for display to a user by an augmented reality application (160).

12 Claims, 7 Drawing Sheets

Related U.S. Application Data

(60) Provisional application No. 62/683,997, filed on Jun. 12, 2018.

(56) References Cited

U.S. PATENT DOCUMENTS

| | | | |
|---|---|---|---|
| 9,740,897 B1* | 8/2017 | Salour | G06K 7/10079 |
| 10,026,229 B1* | 7/2018 | Yalniz | G06T 7/74 |
| 10,602,117 B1* | 3/2020 | Côté | G09B 19/24 |
| 2001/0004210 A1* | 6/2001 | Harada | G01N 27/023 |
| | | | 324/224 |
| 2002/0046368 A1* | 4/2002 | Friedrich | G05B 19/41875 |
| | | | 714/45 |
| 2004/0017929 A1* | 1/2004 | Bramblet | G07C 9/00 |
| | | | 382/103 |
| 2005/0230228 A1* | 10/2005 | Smith | H01H 13/86 |
| | | | 200/5 A |
| 2006/0034726 A1* | 2/2006 | Sunshine | G01N 29/022 |
| | | | 702/22 |
| 2010/0004774 A1* | 1/2010 | Chen | G05B 19/4063 |
| | | | 700/108 |
| 2010/0301990 A1* | 12/2010 | Bourget | H05B 47/155 |
| | | | 340/3.1 |
| 2012/0184252 A1* | 7/2012 | Hirsch | H04M 1/72403 |
| | | | 455/414.1 |
| 2013/0009993 A1* | 1/2013 | Horseman | G16H 40/63 |
| | | | 345/633 |
| 2013/0038633 A1* | 2/2013 | Maggiore | G01N 15/0826 |
| | | | 29/407.01 |
| 2013/0053063 A1* | 2/2013 | McSheffrey | G08B 7/066 |
| | | | 455/456.1 |
| 2016/0035246 A1* | 2/2016 | Curtis | H04L 67/10 |
| | | | 340/815.4 |
| 2016/0140868 A1 | 5/2016 | Lovett et al. | |
| 2017/0202157 A1 | 7/2017 | Onac et al. | |
| 2018/0024362 A1* | 1/2018 | Williamson | G06T 19/006 |
| | | | 345/428 |
| 2018/0081350 A1 | 3/2018 | Seki et al. | |
| 2018/0253876 A1* | 9/2018 | Lin | G06K 7/1413 |
| 2018/0260868 A1* | 9/2018 | Peterson | G06Q 30/0631 |
| 2019/0009956 A1* | 1/2019 | Fitzpatrick | G06F 3/0304 |
| 2019/0011703 A1* | 1/2019 | Robaina | B60K 35/10 |
| 2019/0368758 A1* | 12/2019 | Aller | F24F 11/56 |
| 2020/0013206 A1* | 1/2020 | Seely | G06F 40/154 |
| 2020/0150037 A1* | 5/2020 | Hassani | G01N 21/553 |

OTHER PUBLICATIONS

International Search Report and Written Opinion dated Oct. 2, 2019 which was received in connection with PCT/US2019t036701 and filed in connection with U.S. Appl. No. 17/251,631.

892 Form dated Jul. 7, 2023 which was received in connection with U.S. Appl. No. 17/251,631.

892 Form dated Oct. 26, 2023 which was received in connection with U.S. Appl. No. 17/251,631.

Notice of Allowance dated Apr. 1, 2024 which was received in connection with U.S. Appl. No. 17/251,631.

International Search Report and Written Opinion dated Oct. 2, 2019 which was issued in connection with PCT/US2019/036701 which was filed on Jun. 12, 2019.

\* cited by examiner

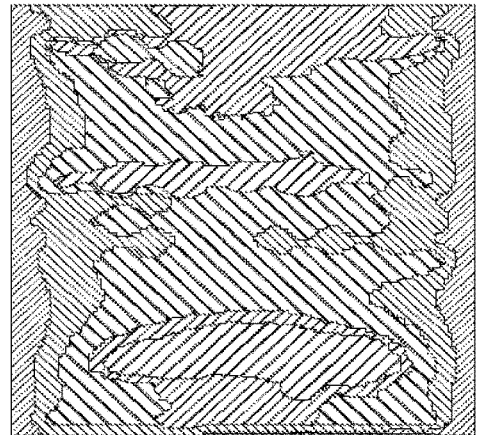

- VISUALIZE ASSETS
- MONITOR AND LOG DATA
- DETERMINE TRENDS
- CONTROL OUTPUTS
- GENERATE ALARMS

THERMAL MAP 330

FIG. 3A

ZONES

| ZONE | ALARMS | ACTIVE CONTROL STRATEGY | SCHEDULE | OFF DELAY | OCCUPIED/ VACANT LEVEL | MAX/ MIN LEVEL | |
|---|---|---|---|---|---|---|---|
| ☐ TEMPERATURE SENSING | | | | | | | |
| ☐ TEMPERATURE SENSING A | | | | | | | 0 0022810300b011b011b6 NTC 1 26.4°C |
| | | | | | | | 0 0022810300b011b011b6 NTC 2 26.6°C |
| | | | | | | | 0 0022810300b011b011b6 NTC 3 27.2°C |
| | | | | | | | 0 0022810300b011b011b6 NTC 4 26.0°C |
| ☐ TEMPERATURE SENSING B | | | | | | | 0 0022810300b011b011bb NTC 1 27.5°C |
| | | | | | | | 0 0022810300b011b011bb NTC 2 27.4°C |
| | | | | | | | 0 0022810300b011b011bb NTC 3 27.0°C |
| | | | | | | | 0 0022810300b011b011bb NTC 4 26.9°C |
| ☐ TEMPERATURE SENSING C | | | | | | | 0 0022810300b011b0129 NTC 4 28.5°C |
| | | | | | | | 0 0022810300b011b0129 NTC 4 29.5°C |
| | | | | | | | 0 0022810300b011b0129 NTC 4 28.2°C |
| | | | | | | | 0 0022810300b011b0129 NTC 4 28.9°C |

310

INFRARED TRACKING

AUGMENTED REALITY (AR) DISPLAY

INTEGRATED MANAGEMENT OF SENSITIVE CONTROLLED ENVIRONMENTS AND ITEMS CONTAINED THEREIN

CLAIM OF PRIORITY

This application is a continuation application of, and claims benefit of and priority to, co-pending U.S. patent application Ser. No. 17/251,631 filed on Dec. 11, 2020, which is a U.S. National Stage Application of PCT/US2019/036701 and claims the benefit of and priority to U.S. Provisional Patent Application No. 62/683,997, filed on Jun. 12, 2018.

BACKGROUND

Monitoring many sensitive environments and items is often still done manually. There are some automated monitoring systems on the market, but they are not integrated into a lighting system. The existing automated solutions must be installed separately and are visible and accessible by customers. These can consist of environmental sensors with communication devices which sit on the shelf with the products, taking up space and getting in the way of customers and stocking operations. Customer tracking solutions exist, but are separate devices placed outside the environments. These tracking solutions do not have the same point of view as placing vision sensors directly in the monitored environments and therefore cannot gather the same type of data. Other solutions are not known for augmented reality visualization of the conditions of sensitive environments.

BRIEF DESCRIPTION OF THE DRAWINGS

FIGS. 3A-3B depict various formats of data display in accordance with embodiments;

DESCRIPTION

Embodying systems and methods provide for monitoring the environmental conditions of a controlled spatial volume. The controlled environments can include, but not limited to, freezers, refrigerators, ambient temperature environments for fresh goods subject to potential spoilage, or controlled environment production areas. Embodiments can be suitable for any controlled environment such as, but not limited to: a showcase, refrigeration unit, cabinet, semiconductor fabrication room, clean room, pharmaceutical production facility, textile production facility (e.g., nylon), food preparation facility, and the like. Environmental conditions that are monitored can include, but are not limited to: temperature, humidity, particulate density, airborne chemical and/or biological contamination, and other conditions.

In accordance with embodiments, the current and/or historical monitored environmental condition(s) can be presented to a user on an augmented reality (AR) map of the monitored spatial volume. The augmented reality map can be displayed on a mobile computing device (tablet, smart phones, laptop, wearable computing devices (watch, eyeglasses, head mounted devices, etc.), touch screen monitors, gesture-controlled devices, etc.), where the mobile computing device includes an AR application. Embodying systems and methods are not so limited to just these types of mobile computing devices. Current and/or future mobile computing device types are within the scope of this disclosure. A user of embodying systems is not limited to using just one type of mobile computing device, but can switch between devices, or use multiple devices concurrently, based on any number of factors.

Embodying systems and methods provide an integrated approach to tracking environmental conditions of assets, while being transparent to customers and not disruptive of current business processes. Additionally, some embodiments can track customer and/or personnel interaction within the monitored spatial volume to provide AR maps showing customer and/or interaction patterns. The interaction frequency to specific points within the spatial volume indicated by color coding and/or density of traces showing the path of interaction.

Embodying systems include the integration of sensors and controls into lighting fixtures to provide monitoring, analytics, and controls in a cost effective and simple manner. The sensor/control integrated lighting fixture(s) can be installed within the spatial volume (e.g., inside a refrigeration display cabinet, or ceiling mounted within a fabrication site). The sensor/control/integrated lighting fixture can provide data for use by the AR application to provide analytics and managerial information on these sensitive environments.

Figure 1:
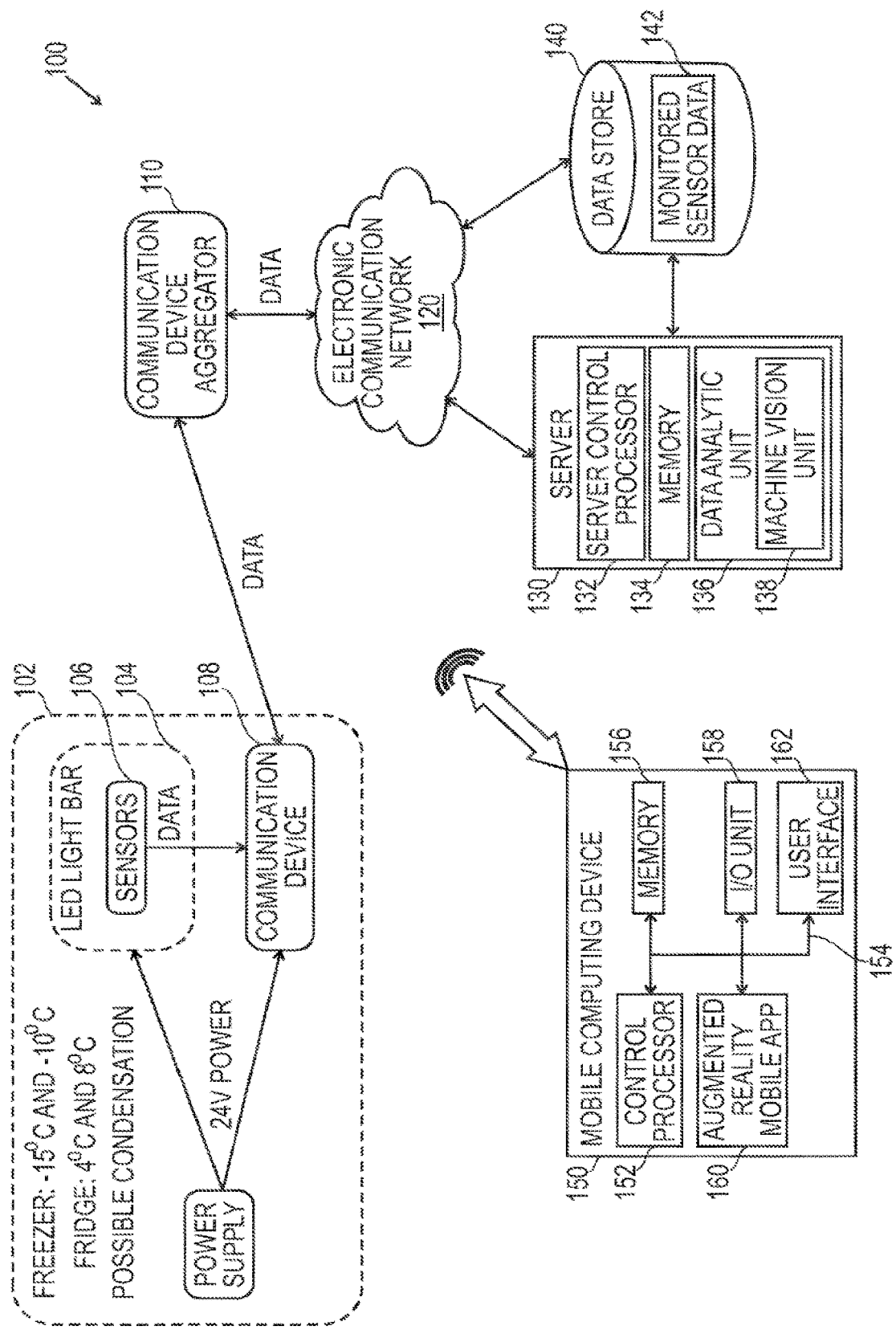
FIG. 1 depicts a system block diagram for management of a controlled environment in accordance with embodiments.

FIG. 1 depicts system 100 for monitoring and management of a controlled environment in accordance with embodiments. System 100 includes monitored spatial volume 102. For purposes of discussion only, the monitored spatial volume is depicted as a refrigeration/freezer unit. However, embodiments are not so limited, and are equally applicable to other monitored spatial environments as noted above.

Within the volume are located one or more lighting fixtures 104 (illustrated as a LED light bar). Integral with the lighting fixture are one or more sensors 106. The sensors can be selected to monitor one or more environmental conditions dependent on the particular nature of the controlled environment. In the depicted embodiment, the sensors are monitoring thermal and humidity (i.e., water vapor) conditions.

The sensors provide data to communication device 108. In some implementations, the communication device 108 provides the monitored data to communication device aggregator 110. In accordance with implementations, communication can be wireless, or wired, and can include various protocols—e.g., radio, cellular, RS 232 communication, Bluetooth, WiFi, Zigbee, TCP/IP, etc.

The communication device aggregator can be implemented at facilities that can have multiple, monitored spatial volumes each with one or more communication devices 108. For example, a retail food establishment can have walls of individual refrigeration, or freezer units. The communication device aggregator can be local to the facility. Aggregation of data at the local level can provide for efficient use of communication bandwidth when the monitored data is provided to data store 140 across electronic communication network 120. However, communication device aggregator 110 need not be implemented in all embodiments. In such embodiments, communication device 108 can be in communication with the data store, or retain the monitored data locally for analysis and display.

Electronic communication network 120 can be, can comprise, or can be part of, a private internet protocol (IP) network, the Internet, an integrated services digital network (ISDN), frame relay connections, a modem connected to a phone line, a public switched telephone network (PSTN), a public or private data network, a local area network (LAN), a metropolitan area network (MAN), a wide area network (WAN), a wireline or wireless network, a local, regional, or global communication network, an enterprise intranet, any combination of the preceding, and/or any other suitable communication system. It should be recognized that techniques and systems disclosed herein are not limited by the nature of the electronic communication network.

Data store 140 can include monitored sensor data records 142. The data records can be organized by a unique identifier representing a particular sensor of a particular lighting fixture.

Server 130 can be in communication with monitored sensor data records 142 across the electronic communication network, and/or by direct communication with the data store 140. The server can include server control processor 132, memory 134, and data analytic unit 136. The data analytic unit can access the monitored sensor data, analyze the data, and generate information for display to a user in one or more formats. The data analytic unit can include machine vision unit 138 that can analyze the sensor data to create AR data for display to the user. A server application can provide data logging, threshold alarm generation, sensor failure generation, data visualization, control capabilities, etc.

Mobile computing device 150 can include control processor 152 that communicates with other components over internal data/control bus 154. Control processor 152 accesses computer executable instructions, which can be stored in memory 156. Mobile computing device 150 can include user interface 162 (e.g., display screen and keyboard). The mobile computing device can include input/output (I/O) unit 158 that communicates wirelessly across an electronic communication network. I/O unit 158 can support one or more hardwire and/or wireless communication protocols including, but not limited to, cellular telephone protocol, Bluetooth, low energy Bluetooth, iBeacon, near field communication, Airplay, etc. Augmented reality app 160 can render an AR display for presentation to the user based on the information generated by the machine vision unit.

Figure 2A:
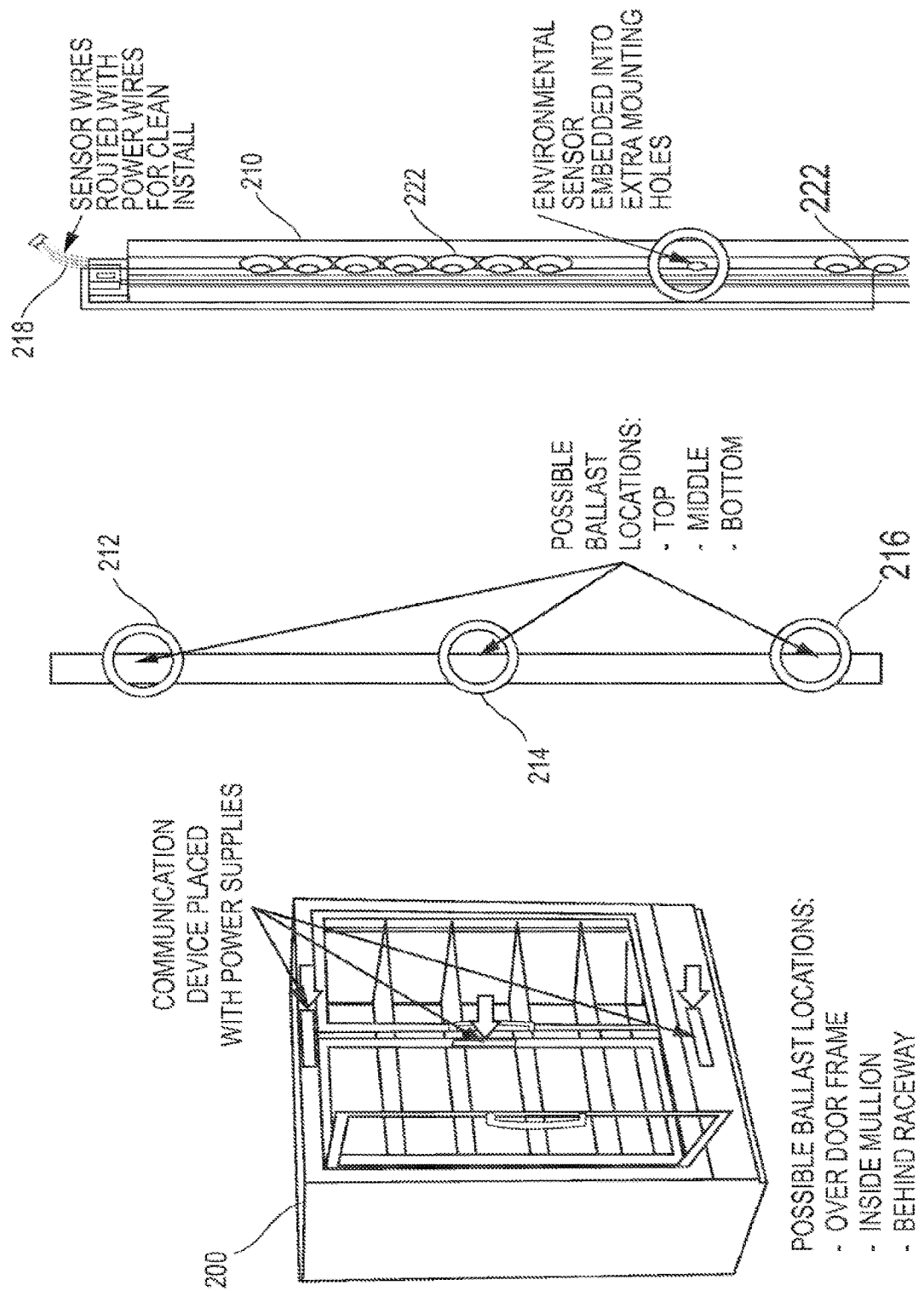
FIGS. 2A-2B depict a monitored spatial volume in accordance with embodiments.
Figure 2B:
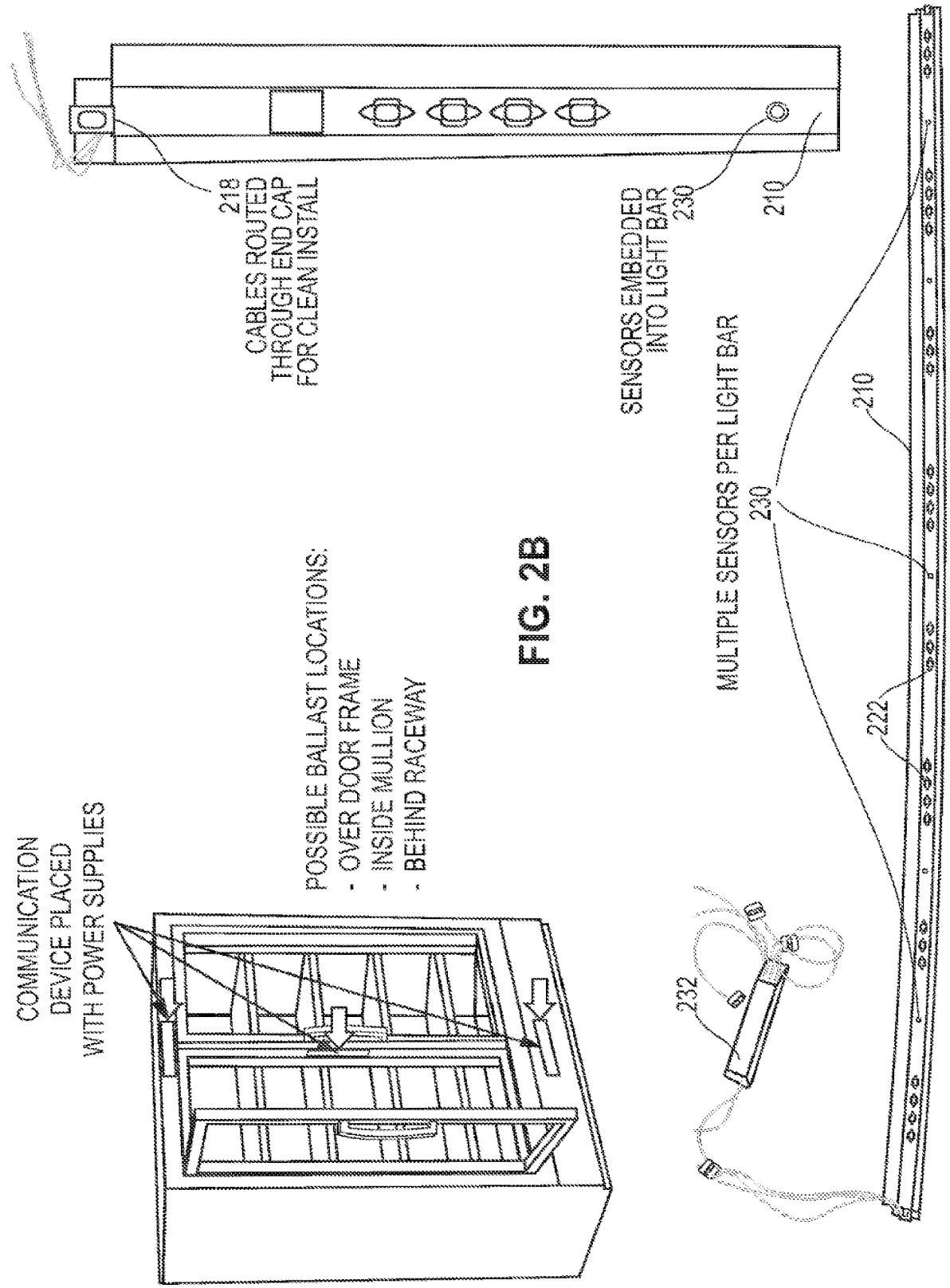

FIGS. 2A-2B depict monitored spatial volume 200 in accordance with embodiments. For purposes of discussion, monitored spatial volume 200 is depicted as a refrigeration showcase unit. LED light bar 210 can include one or more printed circuit boards 222, each having a plurality of LED light sources. Mounted at locations 212, 214, 216 can be sensors 230, to provide information on monitored spatial volume 200. In some implementations, sensors can be mounted at locations corresponding to predetermined areas of the monitored spatial volume. For example, sensors 230 can be positioned to monitor a corresponding shelf of a showcase. For larger monitored spatial volumes, a sensor can correspond to positions of workbenches, fabrication equipment, storage tanks, etc.

Data wires 218 for the sensors can be similarly routed as power wires for the LED printed circuit boards. Electronic driver circuit 232 for the LED light sources, and/or the sensors, can be positioned over the door frame, within cable raceways, or an interior side of a mullion. In some implementations, power for the electronic driver circuit, sensors, and LED light sources can be provided by the monitored spatial volume power source. Communication device 108 can also be positioned over the door frame, within cable raceways, or an interior side of a mullion.

Sensors 230 can be embedded into extra mounting holes. Data from the sensors is provided to communication device 108, which can be part of an open networked wireless control for lighting and building control—for example, a Daintree WSA10 sensor adapter.

Communication device 108 provides sensor data to the communication device aggregator, which can be a wireless area controller (WAC)—for example, a Daintree WAC. Communication device aggregator 110 can provide the aggregated data to other systems and data stores. In some implementations the aggregated data can be provided to third-party services that analyze the data for more advanced monitoring and control capabilities.

Figure 3B:
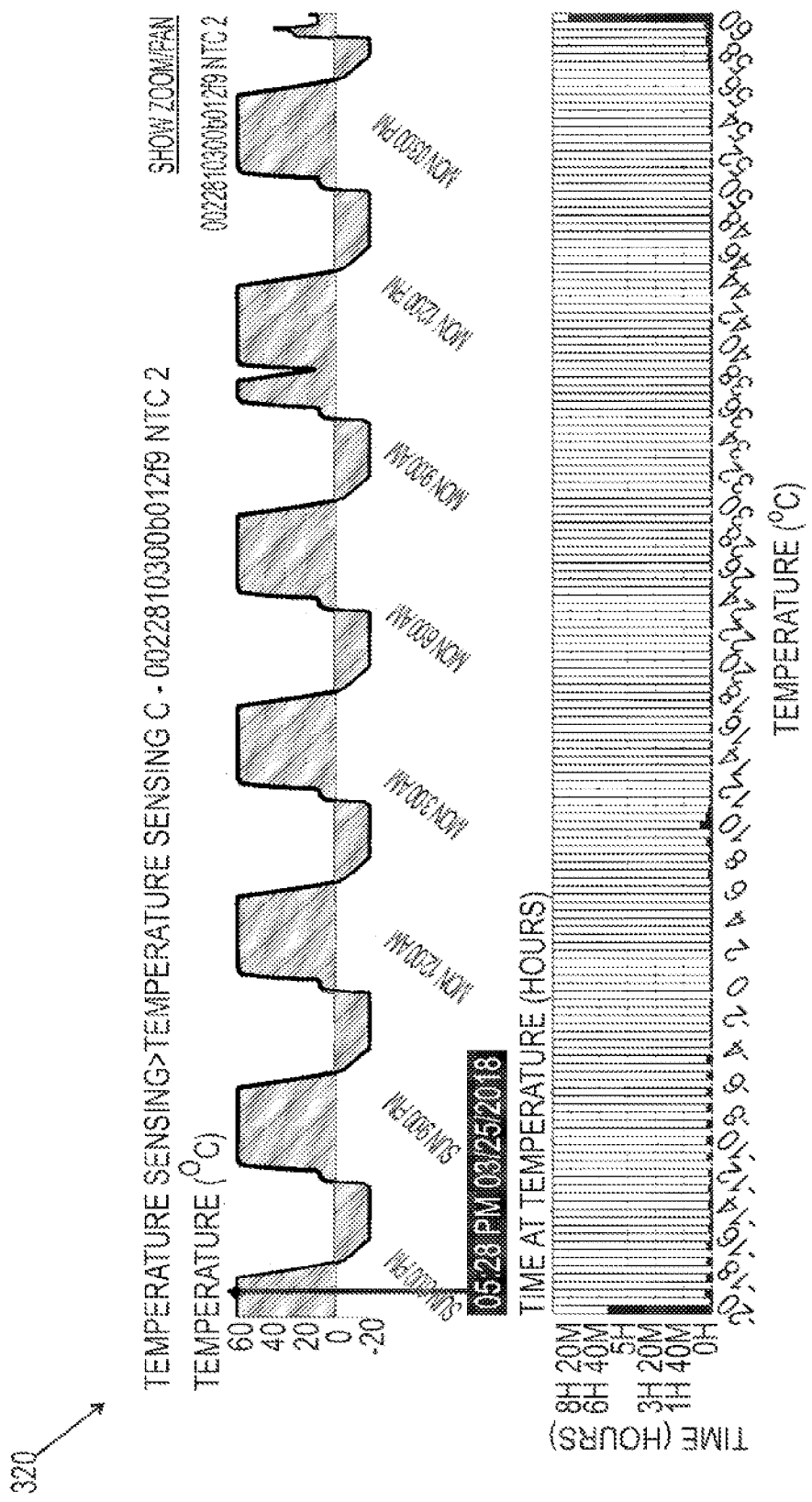

FIGS. 3A-3B depict various formats of data display in accordance with embodiments. Data analytics unit 136 can access the monitored sensor data to create tabular data 310, graphical display data 320, and thermal map 330.

The data analytics unit can analyze the monitored data to visualize assets, monitor and log data, determine trends, control outputs, generate alarms. These actions can be applied to, for example, save spoilage of goods, activate backup control systems when main controls fail, provide alerts when environment changes outside expected ranges (e.g., temperature, humidity, contamination, pressure, sound, vibration, etc.).

Data analysis can detect data trends that might determine future environmental control unit failures. To prevent spoilage, the analyzed data can be compared to predetermined thresholds. If an out-of-tolerance condition is determined, a control signal can be generated that turns on an air blade system when door is left open for long periods—for example, the air blade system can prevent air exchange with outside environment. The air blade system creates a thin, high-velocity sheet of air across the entrance of the environment.

Machine vision unit 138 can apply image recognition techniques to examine the monitored data for anomaly detection, for example, condensation via of water droplets, incorrect light levels in the environment, and other parameters.

Machine vision image recognition techniques can also track which products have been removed from a refrigeration showcase. If that product is not processed at a retail checkout station within a time limit, an alert can be generated that the product is left outside of the refrigeration unit and will spoil.

The machine vision unit can also track personnel, customer, and other interaction activity within the monitored spatial volume by implementing thermal vision techniques. Events such as opening/closing the door, and which section/shelf was accessed can be recognized via machine learning and application of thermal thresholds. The monitored data for these techniques can also include changes in environment (temperature, pressure, lighting, humidity), distance sensors (IR, sonar).

In some implementations, the monitored spatial volume need not be an environmentally controlled space. For example, a retail product showcase can provide thermal and/or motion data (using video and/or or infrared cameras/sensors) that can be used by the machine vision unit to track customer interaction with product placement within the showcase.

Figures 4A, 4B:
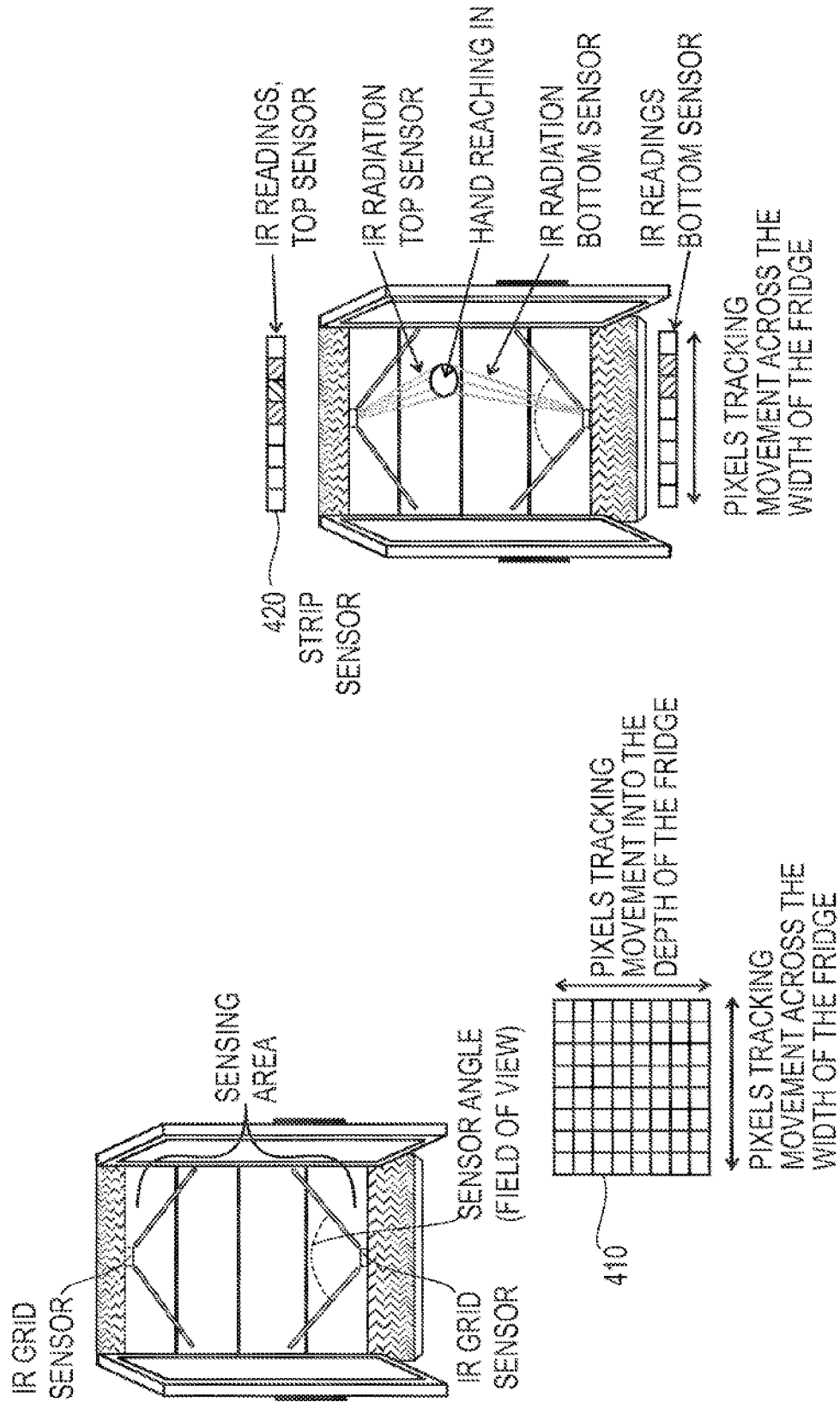
FIGS. 4A-4B depict sensor placement for the system of FIG. 1 in accordance with embodiments.

FIGS. 4A-4B depict placement of infrared grid sensor 410 and infrared strip sensor 420 in accordance with embodiments. In some implementations, an infrared grid solution can involve two infrared grid sensors 410 placed opposite of each other, for example at the top and bottom of a spatial environment to be sensed. The axis of the grid across the front face of the fridge allows for detection of the position across a shelf. The ratio of infrared radiation detected between the two sensors determines which shelf. The machine vision unit can analyze movement (i.e., thermal differences) of a hand in and out of the fridge along the axes of the infrared grids' axis.

In other implementations, infrared strip sensors 410 can be integrated into the monitored spatial environment. For example, the placement of three strip sensors orthogonal to each other (X, Y, Z axes), can provide monitored data for the machine vision unit to determine movement within the spatial volume.

Figure 5:
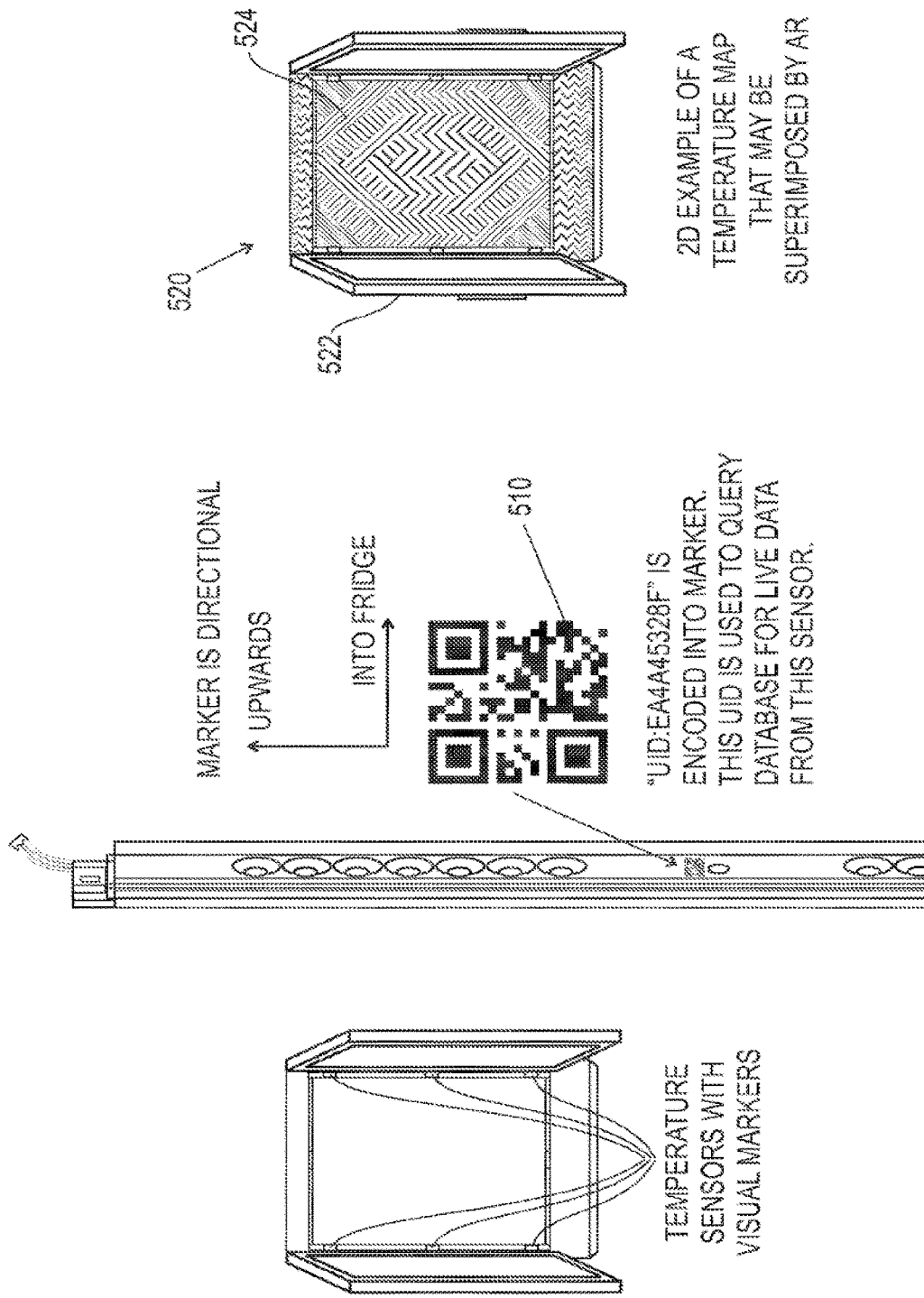
FIG. 5 depicts aspects of an augmented reality display for data collected on the system of FIG. 1 in accordance with embodiments.

FIG. 5 depicts aspects of AR display 520 of monitored sensor data in accordance with embodiments. Users can be presented with an AR display on the display of mobile computing device 150. The AR display can be generated by AR app 160 installed on the mobile computing device. Personnel can view an AR rendition of monitored sensor data on the mobile computing device by using a display feature of user interface 162. For example, the AR rendition view can be thermal map 524 of a refrigeration unit, interaction tracks of customers/personnel within the monitored spatial volume, etc. The AR rendition can include in situ feature details of the monitored spatial volume—for example, refrigeration frame and doors 522 are rendered in AR display 520.

A unique identifier for each sensor can be encoded into visual marker 510. Data reported by the sensors can be correlated with the unique identifier as the data is stored in monitored sensor data records 142. The visual markers can be placed in proximity to the location of sensors 230, so that a visual camera of the mobile computing device can read the visual marker. Reading the visual marker informs the AR app as to which data records are to be presented in the AR display rendition for the portion of the spatial volume within the field-of-view of the visual camera. The visual marker can also include information conveying the orientation of the data within the spatial volume.

In some embodiments, the visual camera need not be within a mobile computing device. For example, a security system with one or more cameras monitoring the spatial volume can read the visual marker(s) within the security camera's field-of-view. An AR application can then generate an AR rendition for display on a security system monitor and/or website.

AR app 160 can create an overlay of the 3D temperature mapping of the fridge provided by the temperature sensors placed throughout the fridge. Orientation of the AR rendition can be based on knowing the plane, and relative positioning of the visual markers. The AR rendition can display numerical values or heatmap colors in a gradient across the fridge, using each sensor to provide intensity at their physical locations.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

The invention claimed is:

1. A system for monitoring a controlled spatial volume comprising:
    a lighting fixture comprising at least one embedded sensor configured to monitor a controlled spatial volume;
    a first infrared grid sensor positioned opposite a second infrared grid sensor, the first and second infrared grid sensors mounted at a top and bottom of a spatial environment defining a grid sensing area within the controlled spatial volume;
    a first communication device for providing monitored sensor data for storage in a data store;
    a server comprising a data analytic unit and configured to communicate with the data store, wherein the data analytic unit accesses monitored sensor data records to analyze the monitored sensor data, provides status information on the spatial volume, and implements thermal vision techniques to track interaction activity in the grid sensing area.

2. The system of claim 1, further comprising a mobile computing device wirelessly connected to the server, the mobile computing device comprising:
    a control processor operably connected to a memory;
    an input/output unit operably connected to the control processor; and
    a user interface operably connected to the control processor;
    wherein the memory includes processor executable instructions which when executed cause the mobile computing device to render a display on the user interface of at least the status information of the controlled spatial volume for presentation to a user.

3. The system of claim 2, wherein the mobile computing device further comprises an augmented reality application, and wherein the control processor runs the augmented reality application and displays an augmented reality rendition of the monitored sensor data on the user interface for viewing by a user.

4. The system of claim 3, wherein the augmented reality application generates an augmented reality rendition for display on the user interface from machine vision analysis of the sensor data.

5. The system of claim 1, further comprising a plurality of visual markers placed in proximity to each of a plurality of embedded sensors, wherein each of the plurality of visual markers provides orientation information and represents a unique identifier for each of the plurality of embedded sensors.

6. The system of claim 5, further comprising:
    a mobile computing device wirelessly connected to the server, the mobile computing device comprising:
        a control processor operably connected to a memory;
        an input/output unit operably connected to the control processor; and
        a user interface operably connected to the control processor;
        wherein the memory includes processor executable instructions and an augmented reality application, and wherein when the processor executable instructions and the augmented reality application are executed the mobile computing device displays on the user interface at least the status information of the controlled spatial volume and an augmented reality rendition including orientation data of the monitored sensor data for presentation to a user.

7. The system of claim 1, further comprising:
a communication device aggregator operatively connected to the first communication device; and
an electronic communication network operatively connected to the communication device aggregator and to the data store, wherein the communication device is configured for aggregating data from a plurality of communication devices associated with a plurality of controlled spatial volumes.

8. The system of claim 1, wherein the at least one embedded sensor is configured to monitor at least one environmental condition within the spatial volume.

9. The system of claim 1, wherein the at least one embedded sensor comprises at least one of a temperature sensor, a humidity sensor, a particulate density sensor, an airborne chemical sensor, and a biological sensor.

10. The system of claim 1, wherein the status information provided by the data analytic unit comprises at least one of tabular data, graphical display data, and thermal map data.

11. The system of claim 1, wherein the controlled spatial volume comprises one of a freezer, a refrigerator, an environment for goods subject to spoilage, a semiconductor fabrication room, a clean room, a pharmaceutical production facility, a textile production facility, and a food preparation facility.

12. The system of claim 1, wherein the data analytic unit further comprises a machine vision unit, wherein the machine vision unit applies image recognition techniques to examine monitored data for anomaly detection and to track products which have been removed.

* * * * *